United States Patent
Jensen

(10) Patent No.: US 7,949,727 B2
(45) Date of Patent: May 24, 2011

(54) TABLE BASED DISTRIBUTED CONTROL FOR A NETWORK OF CONSUMER ELECTRONICS

(75) Inventor: Soeren Borup Jensen, Struer (DK)

(73) Assignee: Bang & Olufsen A/S, Stuer (DK)

(*) Notice: Subject to any disclaimer, the term of this patent is extended or adjusted under 35 U.S.C. 154(b) by 824 days.

(21) Appl. No.: 11/910,376

(22) PCT Filed: Mar. 31, 2006

(86) PCT No.: PCT/DK2006/000187
§ 371 (c)(1),
(2), (4) Date: Nov. 13, 2007

(87) PCT Pub. No.: WO2006/102904
PCT Pub. Date: Oct. 5, 2006

(65) Prior Publication Data
US 2008/0270582 A1 Oct. 30, 2008

(30) Foreign Application Priority Data
Mar. 31, 2005 (DK) .................................. 2005 00444

(51) Int. Cl.
G06F 15/173 (2006.01)
(52) U.S. Cl. .......................... 709/218; 709/221; 709/223
(58) Field of Classification Search .......... 709/217–218, 709/220–221, 223
See application file for complete search history.

(56) References Cited

U.S. PATENT DOCUMENTS

| | | | |
|---|---|---|---|
| 5,838,918 A | 11/1998 | Prager et al. | |
| 6,098,098 A | 8/2000 | Sandahl et al. | |
| 6,629,145 B1 * | 9/2003 | Pham et al. | 709/230 |
| 6,704,401 B2 * | 3/2004 | Piepho et al. | 379/102.03 |
| 7,013,331 B2 | 3/2006 | Das | |
| 7,020,881 B2 | 3/2006 | Takahashi et al. | |
| 7,085,824 B2 * | 8/2006 | Forth et al. | 709/221 |
| 7,177,920 B1 * | 2/2007 | Brown, Jr. | 709/220 |
| 7,281,036 B1 * | 10/2007 | Lu et al. | 709/220 |
| 7,660,266 B2 * | 2/2010 | Ishida et al. | 370/254 |
| 7,716,316 B2 * | 5/2010 | Nichols et al. | 709/223 |
| 7,865,573 B2 * | 1/2011 | Tyhurst et al. | 709/218 |
| 7,865,741 B1 * | 1/2011 | Wood et al. | 713/193 |
| 2002/0120750 A1 | 8/2002 | Nidd | |
| 2003/0018755 A1 * | 1/2003 | Masterson et al. | 709/220 |
| 2003/0187963 A1 * | 10/2003 | Tsai et al. | 709/220 |
| 2003/0231212 A1 | 12/2003 | Slemmer et al. | |
| 2004/0083303 A1 | 4/2004 | Hwang | |
| 2004/0117824 A1 | 6/2004 | Karaoguz et al. | |

(Continued)

FOREIGN PATENT DOCUMENTS

EP 1 311 118 A1 5/2003

(Continued)

*Primary Examiner* — Faruk Hamza
(74) *Attorney, Agent, or Firm* — Roberts Mlotkowski Safran & Cole, P.C.; David S. Safran

(57) ABSTRACT

A system with a number of consumer electronics units interconnected by a digital data network, each of the units comprising a computer for controlling the functioning of the unit itself and the functioning in interplay with the other units in the network. The computer is provided with at least one general table with interrelated table entrances, wherein each available functional state of the unit and each available interplay with other units is given by an entrance in this at least one table.

21 Claims, 10 Drawing Sheets

U.S. PATENT DOCUMENTS

| | | | |
|---|---|---|---|
| 2004/0139173 A1 | 7/2004 | Karaoguz et al. | |
| 2007/0112909 A1* | 5/2007 | Miyamoto et al. | 709/200 |
| 2007/0239700 A1* | 10/2007 | Ramachandran | 707/5 |
| 2011/0004676 A1* | 1/2011 | Kawato | 709/221 |

FOREIGN PATENT DOCUMENTS

| | | |
|---|---|---|
| EP | 1 435 752 A1 | 7/2004 |
| GB | 2361849 A | 10/2001 |
| JP | 2004-40359 A | 2/2004 |

* cited by examiner a)

| Parm-1 and | Parm-2 and | Parm-3 ---- and | Parm-n |
|---|---|---|---|
| xxp | yyp | zzp | qyz |
| xxr | yyp | zzp | qzx |
| xxs | yyr | zzr | qyx |
| xxs | yys | zzs | qzy |
| xxs | yyr | zzr | qxz |
|  |  |  |  |
| xxp | yyr | zzr | qxy | or / or / or / or · · · or

705 b)

| Parm-1 and | Parm-2 and | Parm-3 ---- and | Parm-n |
|---|---|---|---|
| xp | yp | zp | xyz |
| xr | yp | zp | yzx |
| xs | yr | zr | zyx |
| xs | ys | zs | xzy |
| xs | yr | zr | yxz | or / or / or / or 700    710

Figure 7.

TABLE BASED DISTRIBUTED CONTROL FOR A NETWORK OF CONSUMER ELECTRONICS

BACKGROUND OF THE INVENTION

1. Field of Invention

The present invention relates to the functioning of a system with a number of consumer electronics units interconnected by a digital data network, where each of the units comprises a computer for controlling the functioning of the unit itself and the functioning in interplay with the other units in the network.

2. Description of Related Art

The huge amount of products that are available for daily use to support information access e.g. processing Internet news, music, movies, pictures, ordinary DVD's and CD's, media broadcasts, and telecommunication information raises a strong demand for intelligent and simple-to-use equipment, for accessing the user relevant information.

In use today is a system, where a single remote control can be adapted for use with different apparatuses, such as television, CD player, radio, which are all interconnected through a digital network. To ensure a proper interplay between the different electronic consumer units, the units, typically, need a special hardware configuration, which is a complicated process, normally, not made by the user but by a specially trained technician. This makes the configuration procedure complicated and expensive. Especially, a new hardware and software configuration is necessary when a new product is added to the network.

Thus, ease of installation, ease of upgrade, flexibility, and, optionally, adaptation to actual use patterns, as well as methods to support a user friendly access to the target information is strongly required. Features and technologies that secure an effective control processing with fast (real-time processing capability) and dynamic adaptable behaviours is a further demand.

SUMMARY OF THE INVENTION

It is therefore the object of the invention to provide a system for effective configuration of the interconnection between different consumer electronics in an interconnecting network.

This object is achieved by a system with a number of consumer electronics units interconnected by a digital data network, where each of the units comprising at least one computer for controlling the functioning of the unit itself and the functioning in relation with the other units in the network. The computer is provided with at least one general table with interrelated table entrances, wherein each available functional state of the unit, and each available interplay with other units is given by an entrance in this at least one table.

The advantages of using tables are numerous. Even though tables may be very large in order to describe all possible functions and interplay possibilities, operating with tables is fast. For example, it is by far faster than a sequential evaluation of a programmed if-then algorithm. Tables are also easier to check for possible programming mistakes. By using such tables, the work load for correct programming is at the point when tables are created. But this programming is done such that it covers many products and many configurations at the same time, and the products in the network may then in accordance with other units in the network perform the final adjustment of the programming automatically in accordance with predetermined configuration constraints.

Execution of the tables is simple and fast. In addition, expanding the tables with new functions and units is a relatively easy task. This is in contrast to sequential programs according to prior art, where the execution of the programs requires a large calculation capacity and where expansion of the program with new functions and units is very difficult and where the risk for introduction of mistakes with following malfunctioning is high.

As all units comprise all for these units relevant functions and relations to other units in the network, there is no necessity of a general master in the network. Therefore, units with such tables may take over a master function in relation to other units functioning as slaves. Units may as well function as master in one room of a residence and as a slave in another room of the residence. Thus, no central server is required and the configuration of the system components constitutes a pervasive system with embedded and distributed logic in terms of tables, for example of two types: a) state-event-tables and b) constraint tables.

In a concrete embodiment, the general tables comprise a first table being a state event table, wherein each available functional state of the unit is given by an entrance in this state event table, and a second table being a constraint table, wherein each available interplay with other units in the network is given by an entrance in this constraint table.

Such tables may be updated upon request or regularly, for example, each of the units in the network may be configured for receiving a digital prompt through the network for initiating an update of the at least one general table.

For example, the digital prompt may be received from a new unit added to the network. Alternatively, the prompt may be received from a server or other connected computer, and/or via the Internet.

Optionally, the prompt may include or be followed by a fragment of a table with new functionalities in the at least one general table. The fragment or fragments of a table may be received from a new unit added to the network by already existing units in the network or from a central server via the Internet. Alternatively, each unit has a database with available fragments of tables and each unit is configured upon receipt of a prompt from a new unit added to the network to look up the table fragments relevant for this specific new unit and transfer the fragment or fragments from the database to the at least one general table.

Thus, the invention implies an adaptation of the units to the technical infrastructure which is fast and an effective tool for the benefits of the user. Basically, the demand is to offer the capabilities for adapting the configuration of the units on the network. This supports a plug-and-play feature where the functional behaviour in total by the system as offered to the user is dynamically adjusted to the actual configuration of products that constitutes a system at a given time. The update of the tables may be achieved through an online reload of individual control structures for the specific apparatus in question to change or add functional behaviours of a system, for example via Internet or from a connected Personal Computer. The feature enables a flexible upgrade of operational control (man-machine-interface) available for the user. In other words, the configuration in the units of the network is adapted when products are added to the network or removed from the network.

When units are removed from the network, this may lead to a change of the tables as well. The units may be configured to check the presence of the other units in the network by a polling action through the network. In addition, the units may be configured to update the at least one general table in case that a polling action with respect to one or more of the units in the network has a negative outcome because there is no connection to one or more of the other units. The reason may be a malfunctioning or a removal from the network. This has the great advantage for the user that the units in the network automatically adjust themselves in accordance with the presence of the other units in the network. Thus, a television does not wait for signals from a DVD that has been removed from the network, simply because the tables in the TV are updated quickly as a result of a negative polling action, and the DVD does not reside in the tables as a possible interrelated partner in the network.

In a further embodiment, the units are configured for recording a use pattern as a transaction log and for converting this transaction log into a part of the at least one general table for creation of new functional states of the unit or new available interplays with other units or both. The system is configured for functioning in accordance with the recorded use pattern.

This supports automatic generation of control functions based on recorded use patterns executed by individual users. An example of a sequence of events to record could be:

the user activates the radio news every morning at 7 o'clock in the bedroom, walks to the bathroom at 7.15 and activates the same channel of the radio news, walks to the kitchen at 7.35 and activates the same channel of the radio news, and finally walks to the car at 8.00 and activates the same channel of the radio news.

This use pattern may be linked to the functioning of the apparatus such that the radio is started at 7 o'clock, and the sound is transmitted from the radio, which may be located in the living room, to the loudspeaker system in the bedroom. At 7.15, the loudspeaker system in the bathroom is started to receive the signal from the radio, and at 7.35, the radio sound is sent to the loudspeaker system in the kitchen. At 8 o'clock, the radio in the living room is switched off and the radio in the car is switched on playing the favourite channel.

In a more advanced mode where biometrics equipment is available to detect a user entry into a room, the user movement might be combined with the time intervals complying with the user normal mode of operation.

The use pattern may be implemented automatically or, preferably, implemented after acceptance by the user. In addition, the user may program or change the use patters though a user interface, for example in connection with a personal computer or in connection with a handheld programming device. Such a handheld programming device may as well function as a remote control.

The invention will be explained in more detail with reference to the drawing, where

DETAILED DESCRIPTION OF THE INVENTION

Figure 1:
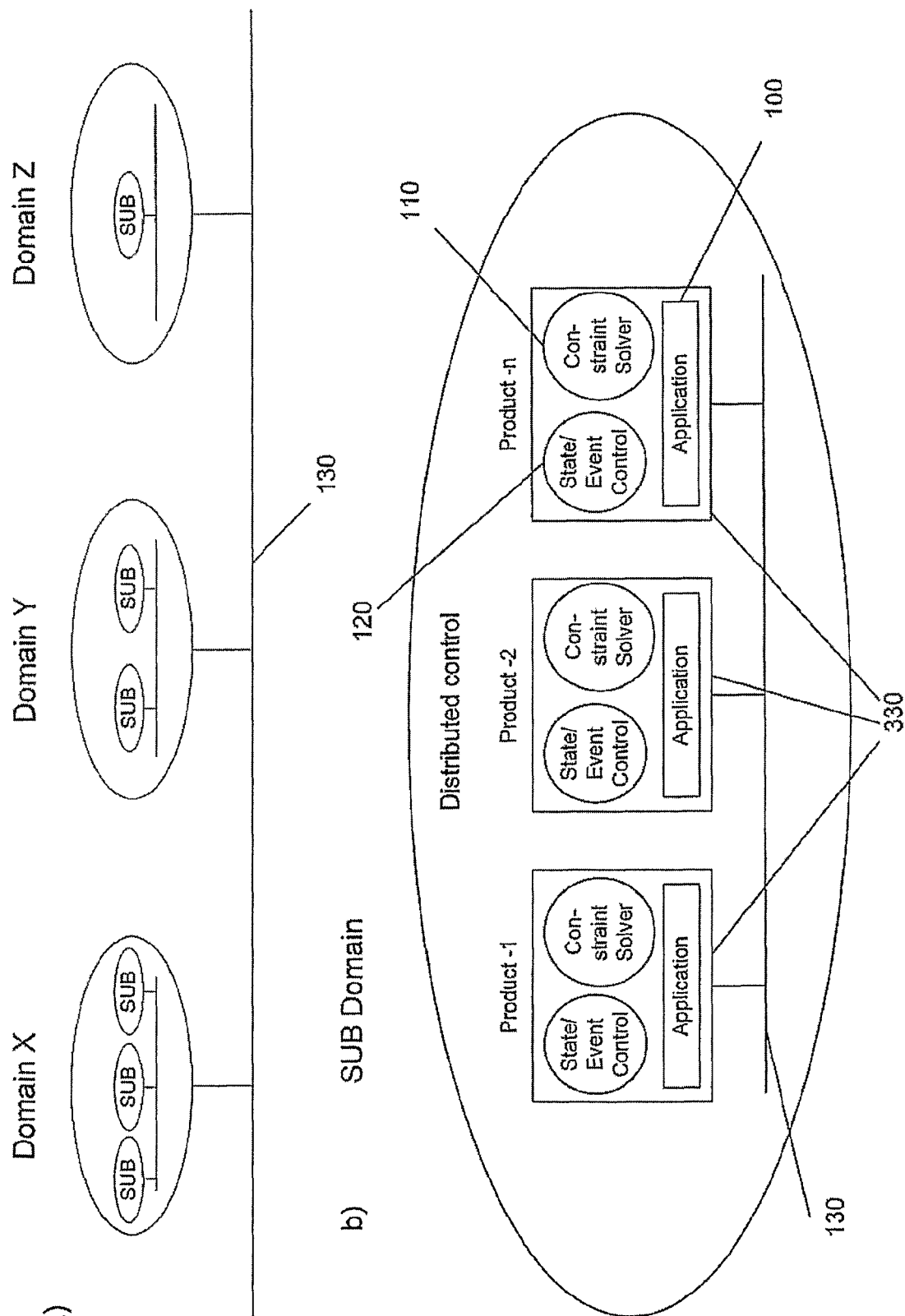
FIG. 1 *a*) is a scheme with a conceptual overview of Domains, Sub-domains, and *b*) illustrates a Sub-domain with respect to products and Distributed Data Driven Control.

FIG. 1*a* is a scheme with a conceptual overview of domains and sub-domains. A domain is organized with one or more sub-domains each being a collection of equipment unit's organized in logical groups and interconnected via networks. Such networks may be wired or wireless or a combination thereof. Examples of domains and sub-domains are a house as a domain with several sub-domains e.g. kitchen, living room, dining room, and bedrooms;

a car as a domain;

an office building as a domain with several sub-domains, e.g. individual offices and conference rooms;

a hotel building as a domain with several sub-domains, e.g. individual guest rooms, meeting rooms, and conference rooms.

FIG. 1*b* illustrates a sub-domain with respect to products and distributed data driven control. The sub domain contains a number of products 330 interconnected via a digital data network 130, for example Internet, WAN (Wide Area Network), LAN (Local Area Network) or by local links.

A specific product, e.g. a TV set, has the main functional control implemented as an application 100. Each product 330 further comprises a State Event Control 120 which is a combination of a control table, the State Event Table, in which the functional state of the product is stored, and a corresponding software program termed State Event Engine, which is a transition control mechanism for control of the unit and accessing the table in accordance with respective commands over the network. Such tables may be reloaded or modified dynamically. The combination 120 is termed State/Event Control as it controls the state of the product 330 in dependency of the different possible events that may change the state. The state-event processing enables a sequential mode of operation as required.

In addition, the product 330 has a Constraint Solver 110, which comprises a table with digital data representing the constraints of the product for the interplay with other products connected to the network and comprises a corresponding software routine termed Constraint Solver Engine, which is a combinatorial solver mechanism governing the allowances and functions for such interplay. In analogy to the State/Event Control, the Constraint Solver 110 operates on data definitions in tables, which may be reloaded or modified dynamically.

The constraint solver processing enables an arbitrary access mode to information with no order of sequences required. This is an important advantage over prior art tree-like programming structure, where the starting point is given by the root of the tree. Especially, when finding ways from nodes within the tree-like program to a specific target location in the tree, it may be obscure with regard to which way to chose, whether backwards or forward, and the final solution may be a new start from the root.

Figure 2:
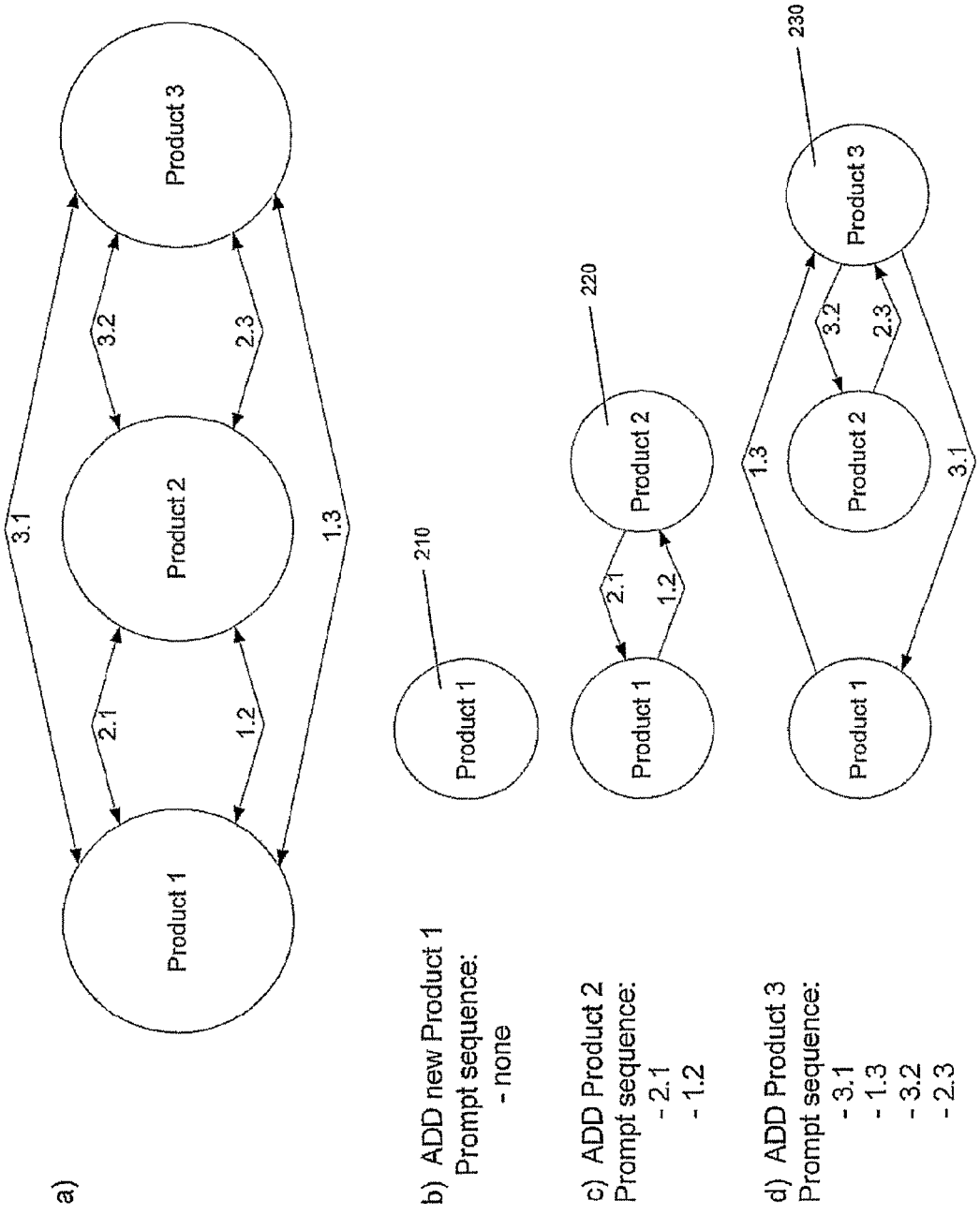
FIG. 2 *a*) is an overview of the configuration sequence when new products are added to existing products; *b*), *c*) and *d*) illustrate the sequence of the interchange of identification information step by step.

In FIG. 2*a*-2*d*, an overview of the configuration sequence is given for new products being added to existing products in the network. According to the invention, the product identification procedure in FIG. 2*a* is executed as a prompting sequence where the most recent added product identifies itself. Starting with the first product 210 alone, no action is related. Adding a new product 220 as illustrated in FIG. 2b, this new product, Product 2, identifies itself by way of a data sequence 2.1 and the initial product, Product 1, in turn gives a response 1.2. Adding one more product, as illustrated in FIG. 2c, this new product identifies itself by a digital data stream 3.1 to the initial product and by a data stream 3.2 to the second product. In return, the initial product gives a response 1.3 as well as the second product 2.3. Based on the result of the prompting and identification procedure the list of active products is stored in the each product 330.

Figure 3:
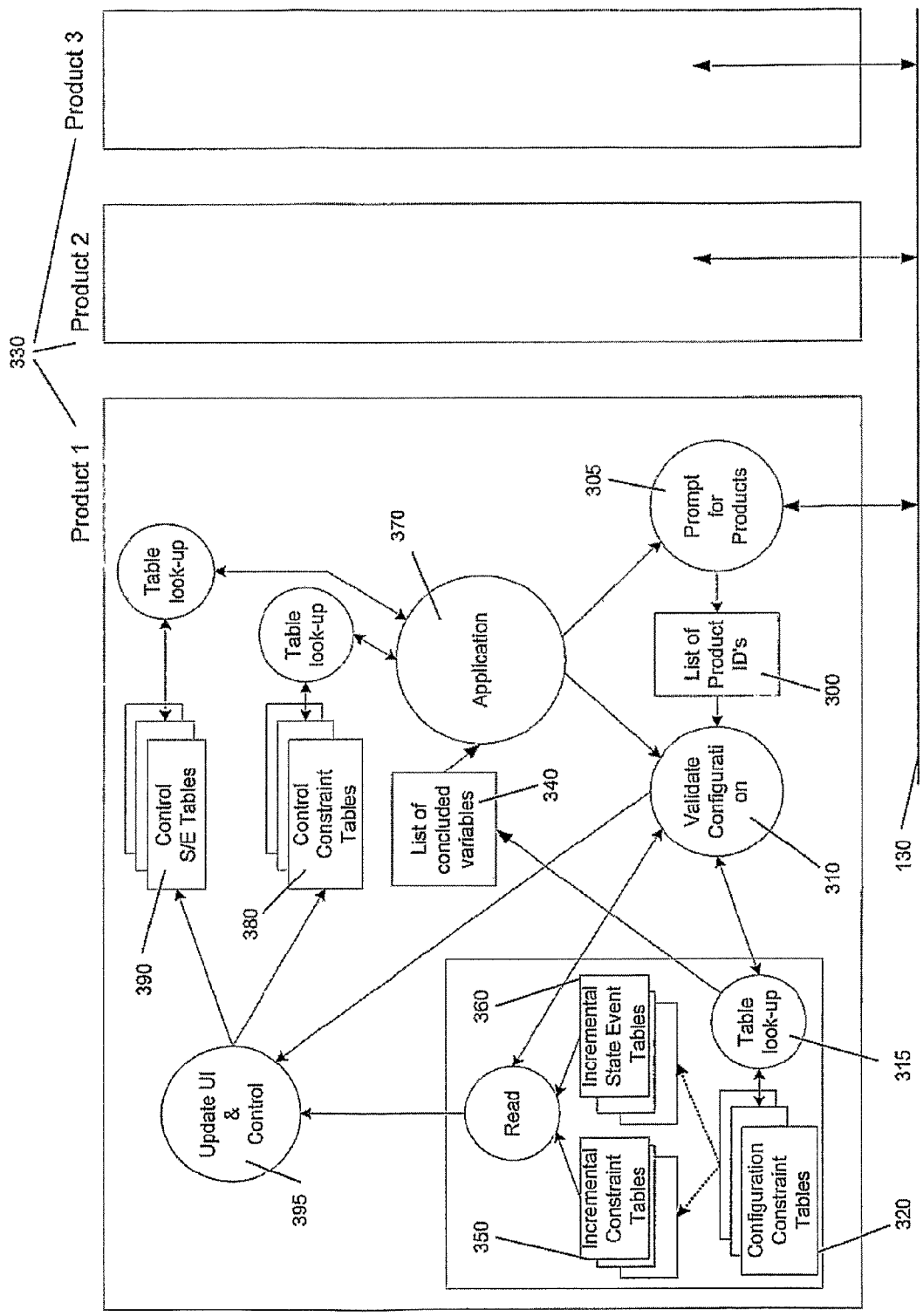
FIG. 3 is a scheme for the adaptation to the actual product configuration.

The procedure is explained in greater detail with reference to FIG. 3. Different products 330 are interconnected via the network 130. When a product receives 305 a request for communication from another product with an identification procedure as explained in the foregoing in relation to FIG. 2, a series of activities are started.

The request initiates an update of the list of product IDs 300 available on the network 130. As a first step, it is examined through a configuration validation procedure 310, whether, according to available data, the new product is relevant for causing a configuration change. For the following possible configuration procedure, a configuration component is built into every product unit. The configuration component accesses tables with constraints 320 relating to other units 330 that might be added on-line to the system. For example, a TV application may get new functions when a DVD (Digital Video Disc) drive is added to the network, which necessitates an update of the tables. In contrast, if a new audio tape recorder is added, it does not necessarily have much influence on the function of the TV, such that a new configuration of the tables may not necessary.

The constraint tables 320 may be resident inside the product 330 but may as well be updated frequently as fragments of tables through the network 130. For example, if a new product is developed, new constraint tables may be necessary to load into existing products in order to achieve a proper interplay between the new and the old products.

Adding new products to the system via the network 130 implies an identification process of the new unit added and an adjustment of the operational behaviour 340 available for the user. The operational behaviour of the apparatus is based on the functions offered by the newly added unit and by the interplay between the old and the new unit. Incremental State Event Tables 360 and incremental Constraint Tables 350 obtained due to the added product are implemented in the internal Control State Event (S/E) tables 390 and the internal Control Constraint Table 380, respectively.

According to the invention, the product configuration domain table is organized as relations among variables 320 in the general mathematical notation of 'Disjunctive Form':

$AttribVariable$ 1.1 and $AttibVariable$ 1.2 and $AttribVariable$ 1.3 and $AttribVariable$ 1.$n$ Or $AttribVariable$ 2.1 and $AttribVariable$ 2.2 and $AttribVariable$ 2.3 and $AttribVariable$ 2.$n$ Or ...

Or ...

Or $AttribVariable$ $m$.1 and $AttribVariable$ $m$.2 and $AttribVariable$ $m$.3 and $AttribVariable$ $m$.$n$ For example, AttribVariable 1.1 may be a television apparatus, AttribVariable 1.1 a video machine, AttribVariable 1.3 a speaker system and AttribVariable 1.$n$ the User Interface. In another example, AttribVariable 2.$n$ may be a reference to another table.

An alternatively definition term is the 'Conjunctive Form':

$AttribVariable$ 1.1 or $AttibVariable$ 1.2 or $AttribVariable$ 1.3 or $AttribVariable$ 1.$n$ And $AttribVariable$ 2.1 or $AttribVariable$ 2.2 or $AttribVariable$ 2.3 or $AttribVariable$ 2.$n$ And ...

And ...

And $AttribVariable$ $m$.1 or $AttribVariable$ $m$.2 or $AttribVariable$ $m$.3 or $AttribVariable$ $m$.$n$ With this method of defining the problem domain, it becomes a multi-dimensional state space enabling equal and direct access to any point in the defined set of solutions. The term multidimensional has to be understood as a contrast to a tree-like programming structure, which is two-dimensional.

According to the invention, the product configuration function 315 proceeds by finding the result 340, 350 or 360 of the interrogation in the set of allowed and possible combinations in the Configuration Constraint Tables 320. According to definitions made in the configuration constraint tables 320, the result might be a list of variables 340 useful in the application 370, a table with constraints 350 to be added to the general set of constraint tables 380 to be used in the support of the application 370, and/or a table with state-event control 360 to be added to the general set of state-event tables 390 to be used in the support of the application 370.

The table driven infrastructure enables ease of adoption to new requirements, as the update of data tables is a simple task 395 as compared to modifications made in a prior art sequential program or reload of the same. The adaptive feature is obtained by having data table driven control functions based on a combination of state transition principles and combinatorial problem solving mechanism. This is in contrast to prior art principles of lengthy sequential programs that are difficult to update and extend.

Figure 4:
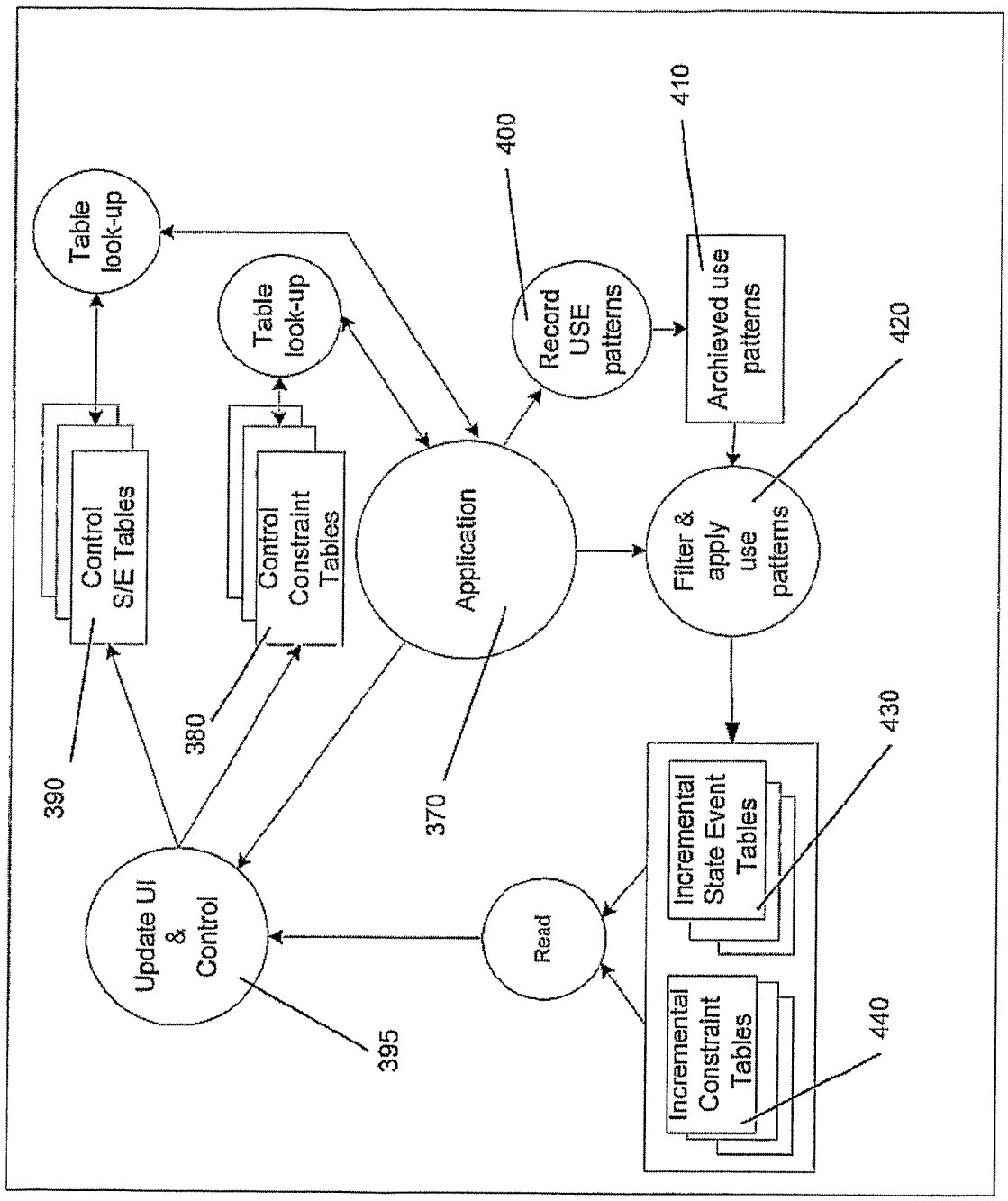
FIG. 4 is a scheme for the adaptation to recorded use patterns.

Another possible adaptation of the functionality of a system according to the invention is to apply recorded use patterns, which will be explained in more detail in the following with reference to FIG. 4. During normal operation, the application 370 records 400 a user behaviour, issued commands, and given responses into an archive as a transaction log 410. For example, this may imply a certain choice by the user of a television program at a specific time of day. At a specified time, automatically, or on specific user request, the content of the transaction log is converted 420 accordingly into incremental State-Event Tables 430 governing the actual functioning of the apparatus in dependence of commands, as well as into Constraint Tables 440 governing the interplay of the products.

Consecutively, an update 395 of the functions in the user interface (UI) and the control of the functions is performed from the incremental table with constraints 440 to be added to a general set of Constraint Tables 380 to be used in support of the application 370, and an update from the incremental State-Event Table 430 to be added to a general set of State-Event Tables 390 to be used in the support of the application 370.

Figure 5:
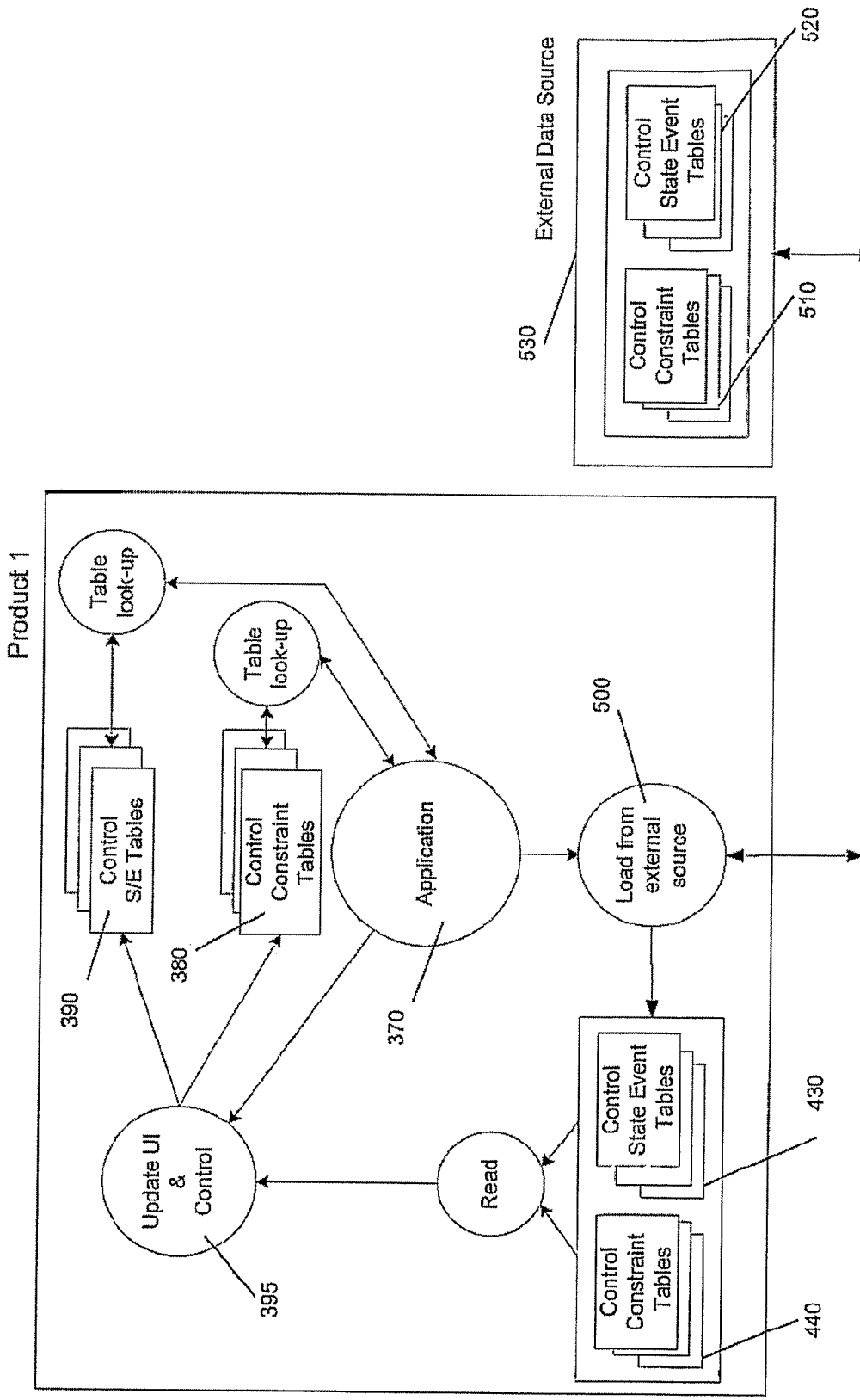
FIG. 5 is a scheme for the adaptation to external definitions.

A further possible adaptation of the system functionality is to apply a new set of control definitions loaded from an external data source, which is relevant when new products are added to the network containing old products without data in their tables for these new products. This will be explained in more detail with reference to FIG. 5. This function supports different modes of operation like upgrading of the definitions and replacing definitions in the different tables. The data definitions to load reside on an external source 530 and may be represented in the format of a State-Event Table 520 and/or in the format of a Constraint Table 510. Upon user request or automatically, the system initiates the load 500 of the tables 510, 520 into the incremental destination tables 430, 440. Through the demanded mode of operation the update function 395 modifies the general target tables 380, 390 consistently by adding the incremental tables 430, 440 or by modifying the data in the general tables 380, 390.

Figure 6:
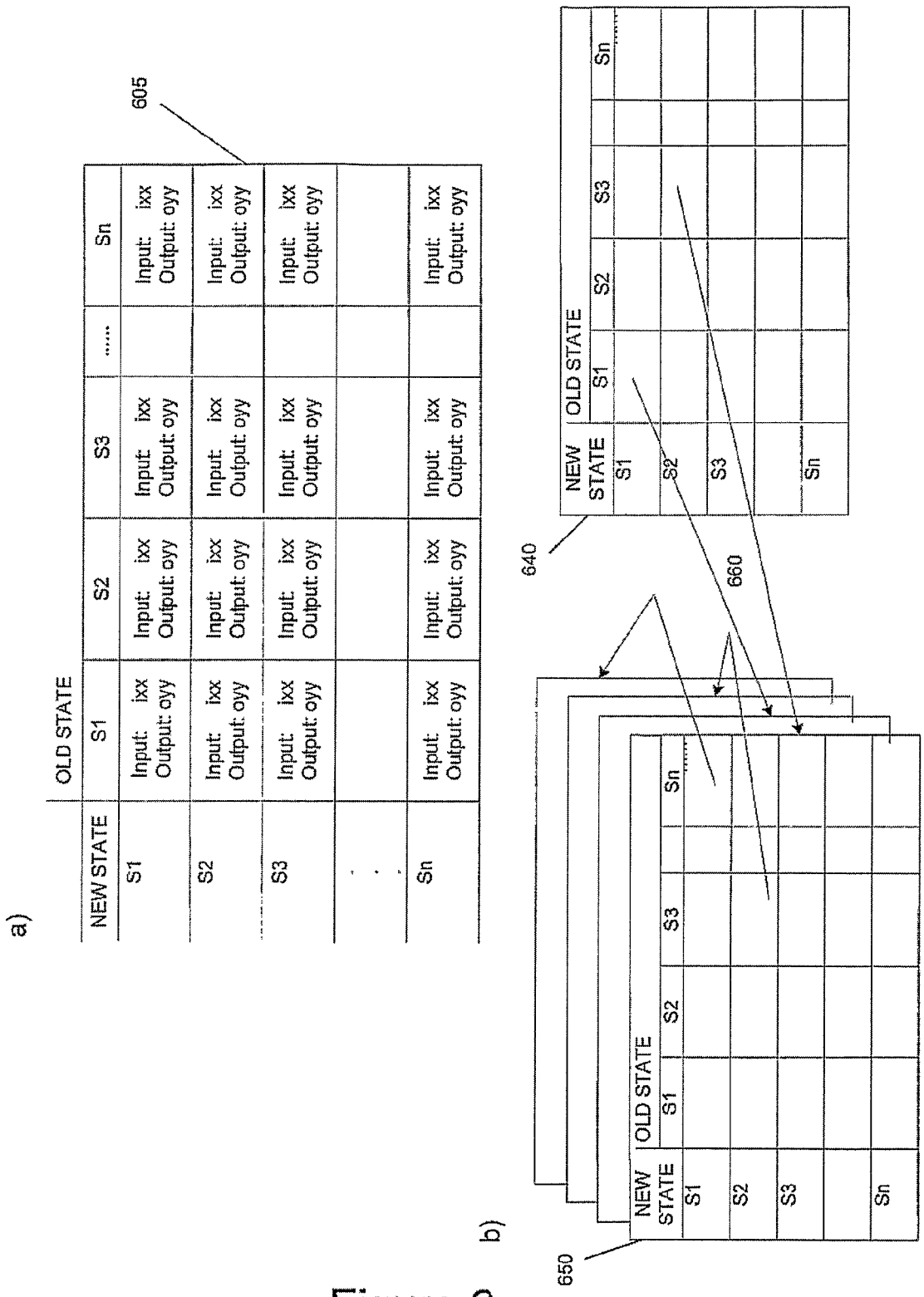
FIG. 6 shows a table structure of the state-event control system.
Figure 6:
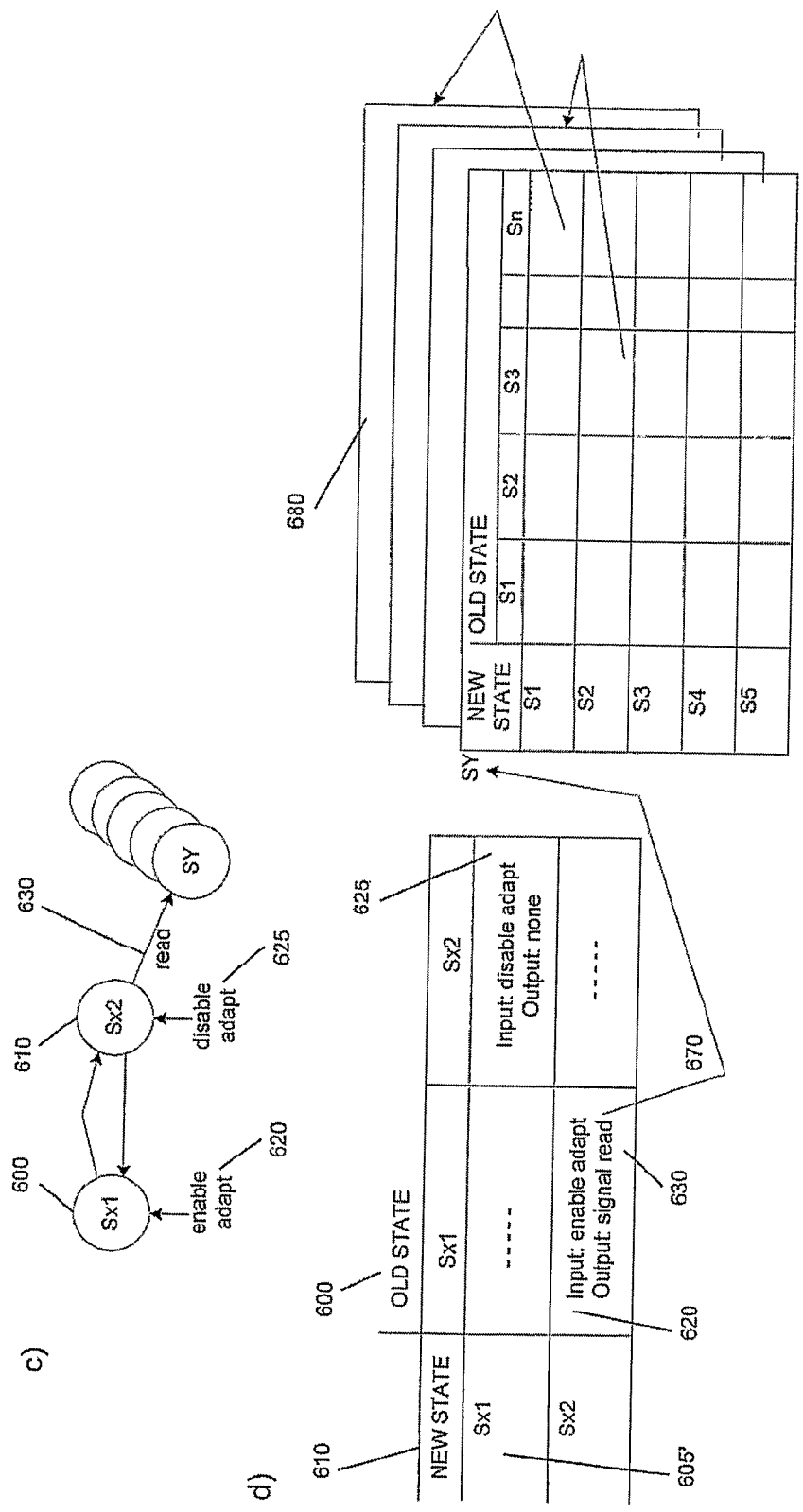

According to the invention, the adaptive behaviour is obtained by dynamically adjusting the contents of the tables for constraint solving, which will be explained below in more detail with reference to FIG. 7 and the and state transition control, which will be explained in more detail with reference to FIG. 6.

The basic state transition control can be described in terms of tables, as illustrated in FIG. 6d or, alternatively, as a transition graph as illustrated in FIG. 6c. The transition graph shows an old state Sx1 600 which due to an input event 620 evolves into a new state Sx2 610 initiating an output 630 command as a trigger named read 670 that activates a read procedure in state event machine SY. Other kinds of actions are possible, for example shutting down of the apparatus.

When in the second state 610, a disable adapt command 625 to disable any further function and force the state to go back to the initial state Sx1.

With reference to FIG. 6d, the above action is likewise described by a state/event table 605, 605'. The upper entrance of the table described the old state 600 and the vertical entrance 610 the new state. It is seen that old state Sx1 600 may change into a new state Sx2 610 as a result from an input command 620 which causes an output command 630 for the new state, where the output command is a read command 670 to activate a parallel state machine controlled by another table 680. Table 680 may have a number of lists/tables that are related to different functions, for example sound of a TV apparatus, picture, links to other products in the network, etc. According to the invention, a specific state control engine is defined to have a dynamic link to the new set of tables 680 that might be adapted to the existing set of state control tables 390, see FIG. 3. As illustrated in FIG. 6d, the activation of the new table complex is triggered automatically or initiated by the user via the input/event 620, which in turn initiates a state transition from Sx1 to Sx2 and generates the output action in terms of a signal 670 that enables a parallel state machine 680 having e.g. a read procedure.

One state table may be linked to a plurality of other state tables, as it is illustrated in FIG. 6b. The table structure allows control of parallel tasks within the same state machine 650, or to activate tasks in another state machine 650 from a current active state machine 640.

The implementation at the execution level is in table format 640 addressing multiple parallel tables to represent parallel state engines 650. Activation of one of the parallel state engines is initiated by signalling an event 660 from one table 640 to another table 650. The signal 660 is of the type output/action as defined in the action part 630 of the table 605'.

For example, record of a television program onto a disk unit has to imply state changes of the television (start of TV, select program at specific time) and state changes of the video recording unit (Start recording unit at selected time, check for available space in recorder, record data signal from television).

Figure 7:
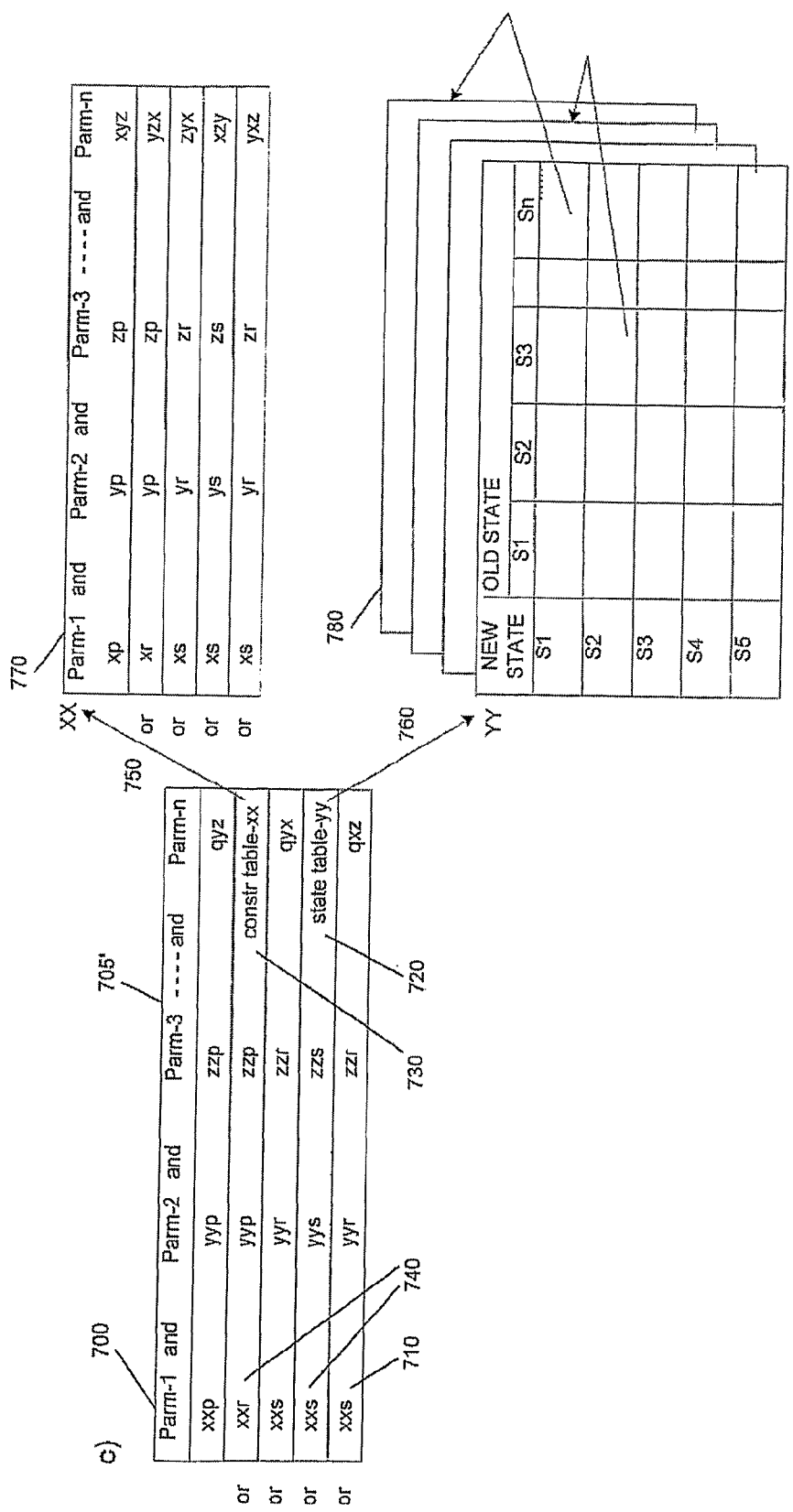
FIGS. 7 *a*), *b*) and *c*) show table structures of the constraint solver control system.

The basic constraint solving might be described in terms of tables as illustrated in FIG. 7. FIG. 7a is a more general model of a Constraint Table 705 and FIG. 7c in a more limited version of a Constraint Table 705' represent the set of legal combinations defined for a number of parameters (Parm) 700 with the attributes of these 710. The attributes/entries 710 in the table refer to the different units interconnected in the network 130. For example, the attribute xp may refer to a TV, the attribute yp to a DVD, etc. and the parameters may be functions such as distribution of video signals, colour control, etc.

Thus, the table in FIG. 7a would contain all legal combinations for the interplay between different units and all related parameters/functions that are possible in relation to the different parameters. Such tables are typically very large and can have millions of attributes/entries. Standard compressing techniques might be applied to reduce the size of the combinatorial state space and still maintaining the logical consistency. Operating with tables is by far faster than a sequential evaluation of a programmed if-then algorithm. Tables are also easier to check for possible programming mistakes. By using such tables, the work load for correct programming is at the point when tables are created. Execution of the tables is simple and fast. In addition, expanding the tables with new functions and units is a relatively easy task. This is in contrast to sequential programs according to prior art, where the execution of the programs requires a large calculation capacity and where expansion of the program with new functions and units is very difficult and where the risk for introduction of mistakes with following malfunctioning is high.

According to the invention, one or more entries 740 in the Constraint Solver Table of FIG. 7c are defined to have dynamic links to other tables 770, 780. Different types of tables may be referenced. A constraint table entry 730 may refer 750 to another Constraint Table 770 and/or a constraint table entry 720 might refer 760 a state transition table 780.

Figure 8:
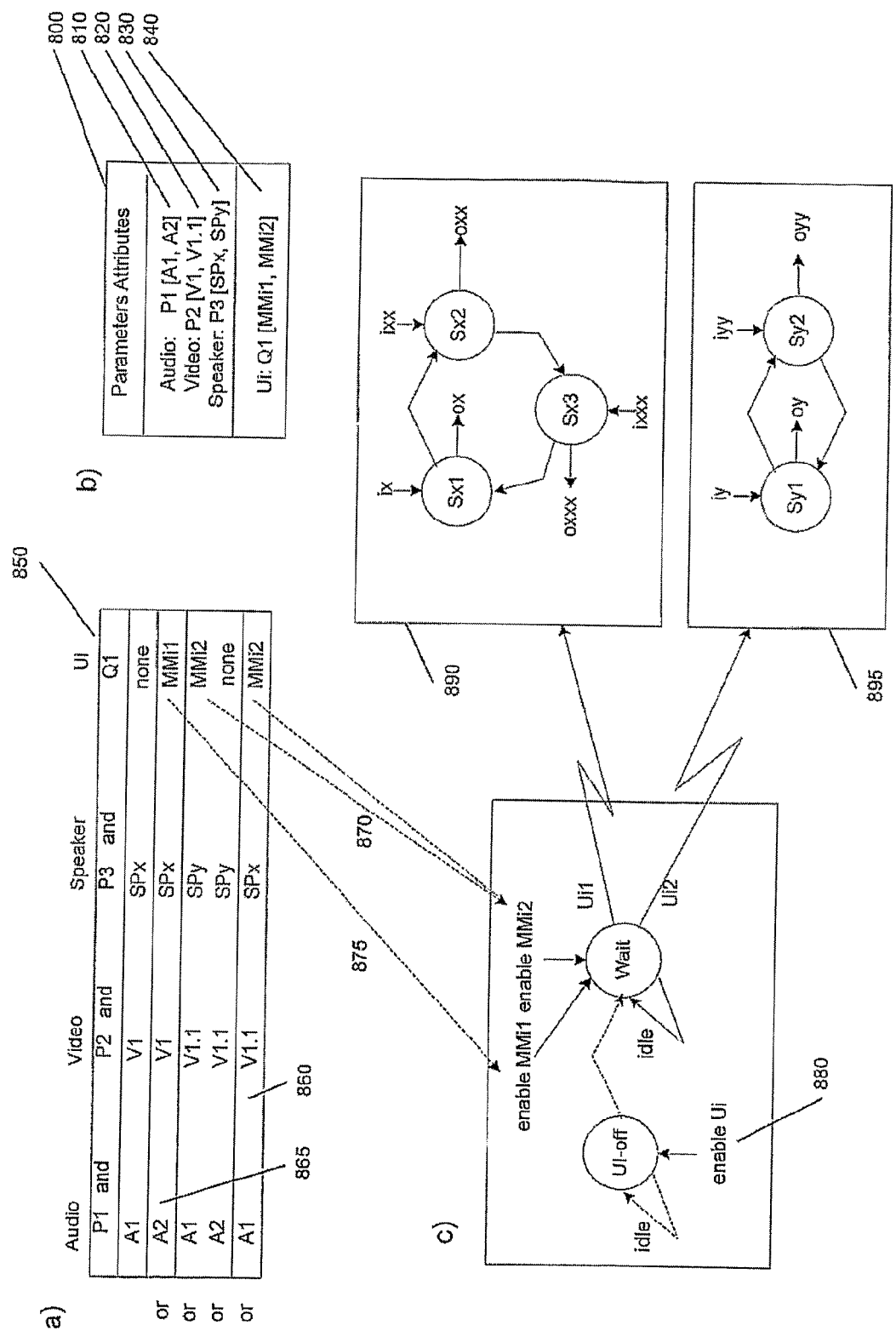
FIGS. 8 *a*) *b*) and *c*) show example of interaction from constraints to state-event control.

FIG. 8b displays an example in a preferred embodiment of the invention. A list of variables is defined 800 with their actual attributes, two types of audio products A1 and A2 810, two types of video products V1 and V1.1 820, and two types of speakers SPx and SPy 830. In addition, two different man-machine interface dialogs MMi1 and MMi2 840 are defined in connection with the User Interface UI.

The configuration is specified in the Constraint Table 850 of FIG. 8a—analogous to the table 320 as explained in connection with FIG. 3—and constitutes the set of legal combinations. Parameter P1 in table 850 refers to audio units, parameter P2 refers to video units, parameter P3 refers to speaker units, and parameter Q1 refers to the User Interface UI.

As an example illustrated in the lower line 860 of table 850, if A1 is selected as the audio unit, V1.1 is selected as a video unit, and SPx is a legal speaker unit, then the UI man-machine-interface type MMi2 is automatically the selected one.

As illustrated by the transition graph of FIG. 8c, interrogation 315 with the configuration table concludes 870 that user dialog Ui2 895 has to be activated when the system is enabled to display 880.

As another example in the second line 865 of table 850, if audio is A2 and video is V1 and speaker SPx is a legal unit, then man-machine-interface type MMi1 865 is applied. Interrogation 315 with the configuration table concludes 875 that user dialog Ui1 890 has to be activated when the system is enabled to display 880.

In connection with tables, it is pointed out that in some cases, there may be a large number of combinations for specific functions. In these cases, a negation may be used if this requires less table space than the positive combinatory expression.

In addition, each table may be equipped with a safety exit that works if combinations are requested that have no counterpart in the table. For example, if the requested combination of parameters is not found in the table, the system may be forced to shut down.

What is claimed is:

1. A system with a number of consumer electronics units interconnected by a digital data network, each of the units comprising one or more computer(s) for controlling the functioning of the unit itself and the functioning in relation with the other units in the network, wherein the computer is provided with at least one general table with interrelated table entrances, and where one or more available functional state(s) of a unit and one or more available interplay(s) with other units is given by an entrance in this at least one table, wherein the at least one general table comprises at least first and second tables, the first table being a State-Event Table, wherein each available functional state of the unit is given by an entry in the State-Event table, and the second table being a Constraint Table, wherein each available interplay with other units in the network is given by an entry in the Constraint table; wherein each unit has a database with available fragments of tables and each unit is configured upon receipt of a prompt from a new unit added to the network to look up the table fragments relevant for this specific new unit and transfer the fragment or fragments from the database to the at least one general table, wherein the units are configured for recording a use pattern as a transaction log and for converting this transaction log into a part of the at least one general table for creation of new functional states of the unit or new available interplays with other units or both, and wherein the unit is configured for functioning in accordance with the recorded use pattern.

2. A system according to claim 1, wherein each of the units in the network is configured for receiving a digital prompt through the network for initiating an update of the State-Event Table.

3. A system according to claim 2, wherein the units are configured for receipt of the digital prompt from a new unit added to the network.

4. A system according to claim 2, wherein the units are configured as a response to the prompt to include a fragment of a table with new functionalities in the at least one general table.

5. A system according to claim 4, wherein the system is configured for transmission of the fragment of a table from a new unit added to the network to the already existing units in the network.

6. A system according to claim 4, wherein the system is configured for transmission of fragments of a table or a complete table from a central server via the Internet to the units in the network as a general update of the at least one general table.

7. A system according to claim 1, wherein the system is configured to request a confirmation by a user through a user interface in order to accept the functioning in accordance with the recorded use pattern.

8. A system according to claim 7, wherein the system is configured for reading input commands from a user though a user interface for amendments in the use pattern.

9. A system according to claim 1, wherein the units are configured to check the presence of the other units in the network by a polling action through the network.

10. A system according to claim 9, wherein the units are configured to update the at least one general table in case that a polling action with respect to one or more of the units in the network has a negative outcome.

11. A system according to claim 1, wherein the consumer units comprise at least one of radios, televisions and digital video recorders.

12. A consumer electronics unit connectable to a system with a number of consumer electronics units interconnected by a digital data network, the unit comprising one or more computer(s) for controlling the functioning of the unit itself and the functioning in relation with the other units in the network, wherein the computer is provided with at least one general table with interrelated table entrances, and where one or more available functional state(s) of the unit and one or more available interplay with other units is given by an entrance in this at least one table, wherein the at least one general table comprises first and second tables, the first table being a State-Event Table, wherein each available functional state of the unit is given by an entry in the State-Event Table, and the second table being a Constraint Table, wherein each available interplay with other units in the network is given by an entry in the Constraint Table; wherein each unit has a database with available fragments of tables and each unit is configured upon receipt of a prompt from a new unit added to the network to look up the table fragments relevant for this specific new unit and transfer the fragment or fragments from the database to the at least one general table, wherein the units are configured for recording a use pattern as a transaction log and for converting this transaction log into a part of the at least one general table for creation of new functional states of the unit or new available interplays with other units or both, and wherein the unit is configured for functioning in accordance with the recorded use pattern.

13. A unit according to claim 12, wherein the unit is configured for receiving a digital prompt through the network for initiating an update of the at least one general table.

14. A unit according to claim 13, wherein the unit is configured for receipt of the digital prompt from a new unit added to the network.

15. A unit according to claim 13, wherein the unit is configured as a response to the prompt to include a fragment of a table with new functionalities in the at least one general table.

16. A unit according to claim 15, wherein the unit is configured in the case of being connected to the network for receipt of the fragment of a table from a new unit added to the network.

17. A unit according to claim 15, wherein the unit is configured for receipt of-fragments of a table or a complete table from a central server via the Internet to the units in the network as a general update of the at least one general table.

18. A unit according to claim 12, wherein the unit is configured to request a confirmation by a user through a user interface in order to accept the functioning in accordance with the recorded use pattern.

19. A unit according to claim 18, wherein the unit is configured for reading input commands from a user though a user interface for amendments in the use pattern.

20. A unit according to claim 12, wherein the unit is configured in the case of being connected to the network to check the presence of the other units in the network by a polling action through the network.

21. A unit according to claim 20, wherein the unit is configured in the case of being connected to the network to update the at least one general table in case that a polling action with respect to one or more of the units in the network has a negative outcome.

* * * * *